Aug. 5, 1952  J. W. RILEY  2,605,568
FISHING LINE CLAMP
Filed June 9, 1950  2 SHEETS—SHEET 1
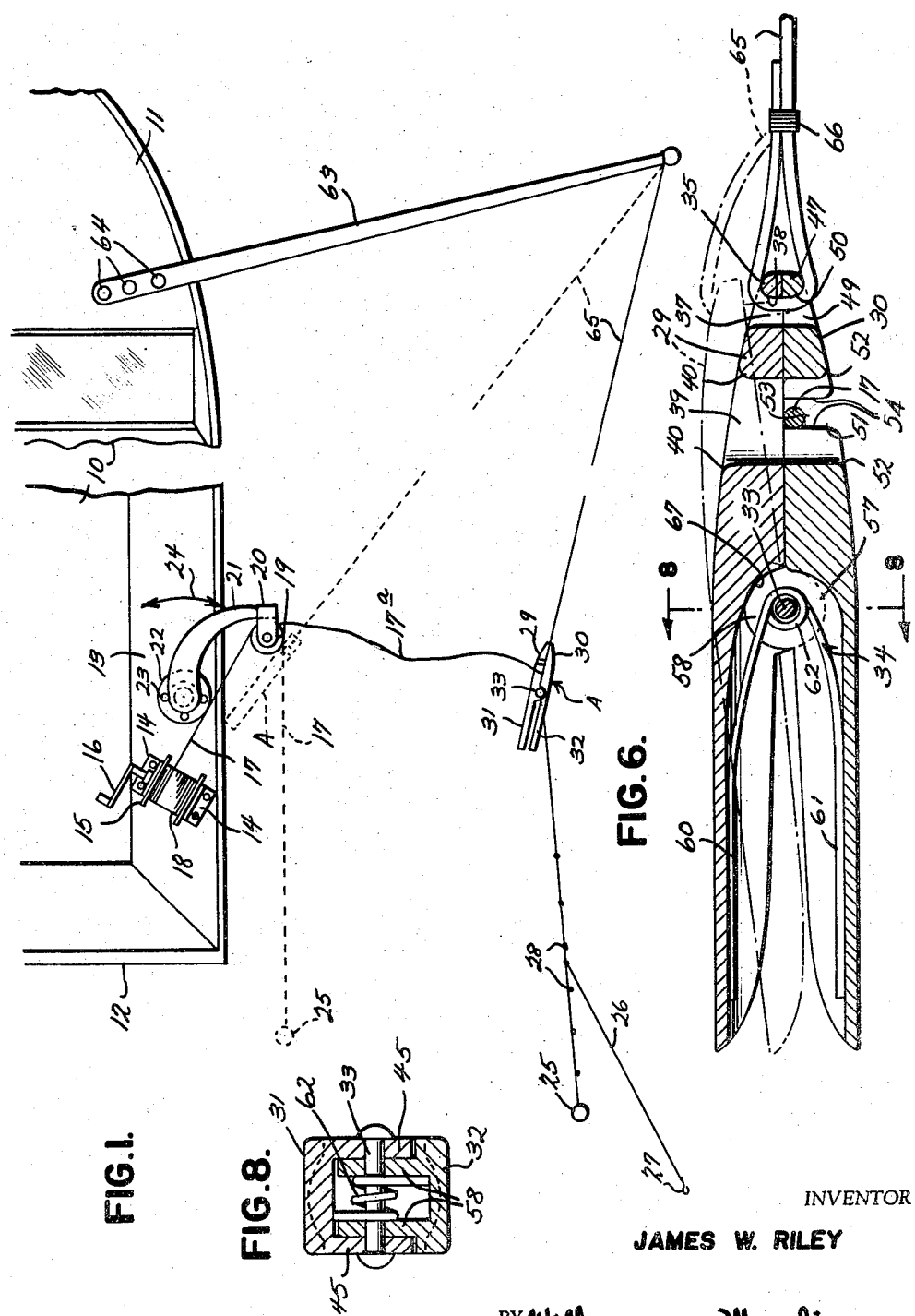
INVENTOR
JAMES W. RILEY
BY Wilkinson & Mawhinney
ATTORNEYS Aug. 5, 1952     J. W. RILEY     2,605,568
FISHING LINE CLAMP
Filed June 9, 1950     2 SHEETS—SHEET 2
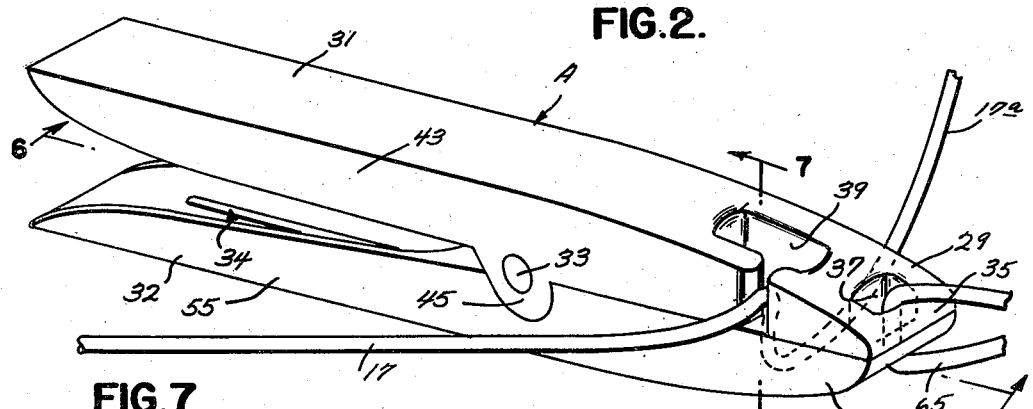
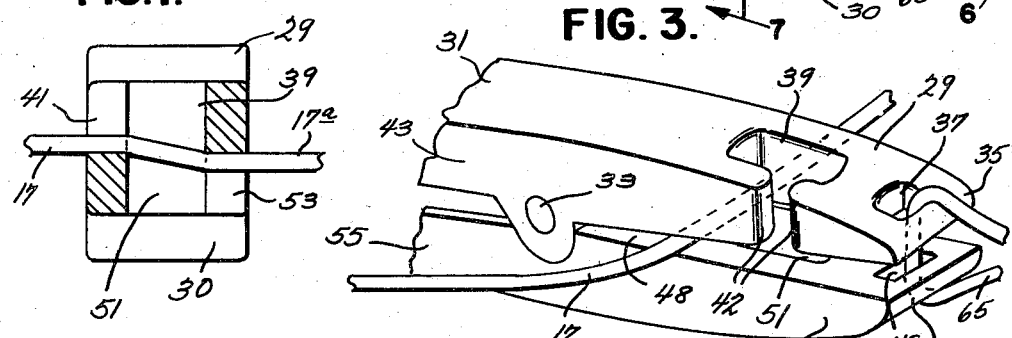
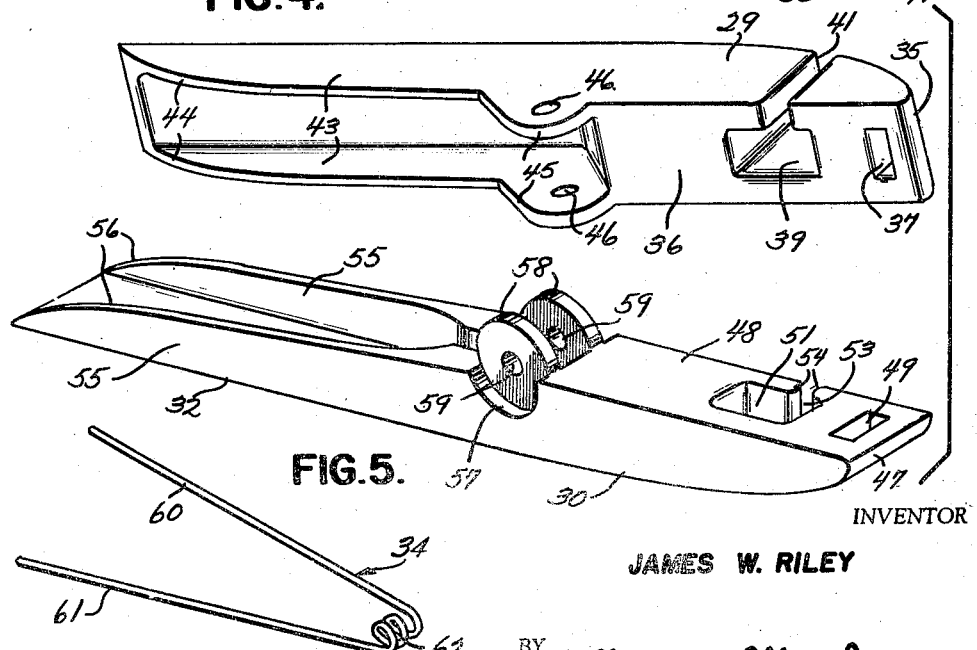
INVENTOR
JAMES W. RILEY
BY *Wilkinson & Mawhinney*
ATTORNEYS

Patented Aug. 5, 1952

2,605,568

UNITED STATES PATENT OFFICE 2,605,568

FISHING LINE CLAMP

James W. Riley, Depoe Bay, Oreg.

Application June 9, 1950, Serial No. 167,017

3 Claims. (Cl. 43—4)

The present invention relates to improvements in a fishing line clamp and has for an object to provide an improved clamp capable of holding a deep sea fishing line at the desired depth and at the desired distance from the boat.

Still another object of the present invention is to provide an improved clamp of this type which does not have to be removed from the wire line at any time.

The present invention aims to provide an improved clamp which comprises relatively few parts, is inexpensive to manufacture and due to the simplicity of its structure is not apt to wear out or get broken.

With the foregoing and other objects in view, the invention will be hereinafter more fully described and more particularly pointed out in the appended claims.

In the drawings, in which the same parts are denoted by the same reference numerals throughout the several views, Figure 1 is a fragmentary top plan view of a fishing boat with the improved device constructed in accordance with the present invention applied thereto, Figure 2 is a perspective view of the improved clamp in its non-clamping position, Figure 3 is a fragmentary perspective view of the clamp with the fishing line clamped therein, Figure 4 is a perspective exploded view of the jaws of the clamp, Figure 5 is a perspective view of the clamp spring, Figure 6 is a longitudinal vertical sectional view taken on the line 6—6 of Figure 2 and looking in the direction of the arrows, Figure 7 is a transverse vertical sectional view taken on the line 7—7 of Figure 2 and looking in the direction of the arrows, and Figure 8 is a transverse vertical sectional view taken on the line 8—8 of Figure 6 and looking in the direction of the arrows.

Referring more particularly to the drawings, 10 indicates a conventional type of fishing boat having a bow 11, a stern 12 and a side 13 on which adjacent the stern 12, is mounted by brackets 14 a conventional type of winch or fish line reel 15 having an operating crank 16. The winch 15 or reel 15 may be of the power operated type or reel 15 and includes a brake. A fish line 17 adapted for use in deep sea fishing is supported upon the drum 18 of the winch and adapted to be wound upon and unwound from the drum. The line 17 may be made of any material suitable for a power fish line for deep sea fishing, such as, steel wire or the like. The free end portion of the line 17 is trained over a pulley 19 which is rotatably mounted on a bracket 20 which in turn is carried by one end portion of an arm 21.

A supporting member 22 is mounted on the side 13 of the boat by screws or the like 23 and the other end of the arm 21 is swivelly supported by the member 22 so that the arm and the pulley can be swung back and forth over the top edge of the side of the boat as indicated by the arrow 24 shown in Figure 1 of the drawing.

A lead or sinker 25 is attached to the free end of the line 17 and a leader 26 has one end secured to the free end portion of the line 17 adjacent the sinker and its opposite end has a fish hook 27 attached thereto. A series of spaced apart stops 28 which may be in the form of stiff wire barbs are mounted on the free end portion of the line 17 between the lead 25 and the pulley 19.

A clamp generally designated at A comprises a pair of movable members having jaws 29 and 30 and hand grip portions 31 and 32, respectively, pivotally connected by a pivot element 33 and a spring generally designated 34 for normally urging the jaws 29 and 30 into gripping engagement. The outer surface of the jaw 29 is inclined downwardly and forwardly to terminate in a rounded forward end nose 35. The inner gripping surface 36 of the jaw 29 is substantially flat and uninterrupted. The nose 35 has a transversely extending slot 37 therethrough, the forward wall 38 of which is rounded and the other walls of which are substantially flat. Between the gripping surface 36 and the slot 37 the jaw 29 has a substantially oblong through opening 39, the major axis of which extends longitudinally of the jaw 29 and the upper edges of the walls defining the opening 39 are rounded as at 40.

The jaw 29 has in one side thereof an entrance passageway 41 which communicates with the opening 39 adjacent the forward end portion thereof. The passageway 41 extends entirely through the side of the jaw 29 and the walls of the passageway are outwardly flared as indicated at 42 to facilitate the entrance of the fish line 17 into the opening 39. The hand grip portion 31 is substantially channel shape in cross section and has downwardly extending side walls 43, the rear end portions of which curve upwardly and rearwardly as indicated at 44. The forward end portions of the side walls 43 have downwardly extending substantially semi-circular bearing ears 45 which are provided with alined apertures 46.

The outer surface of the jaw 30 is inclined upwardly and forwardly to terminate in a rounded forward end nose 47. The inner gripping surface 48 of the jaw 30 is substantially flat and uninterrupted. The nose 47 has a transversely extending slot 49 which is in vertical alignment with the slot 37 in the jaw 29. The forward wall 50 of the slot 49 is rounded and the other walls of the slot 49 are substantially flat. Between the gripping surface 48 and the slot 49 the jaw 30 has a substantially oblong through opening 51, the major axis of which extends longitudinally of the jaw 30 and the lower edges of the walls defining the opening 51 are rounded as at 52.

The jaw 30 has in its side which is remote from the passageway 41 an entrance passageway 53 which communicates with the opening 51 adjacent the forward end portion thereof. The passageway 53 extends entirely through the side of the jaw 30 and the walls of the passageway are outwardly flared as indicated at 54 to facilitate the entrance of the fish line 17 into the opening 51. The hand grip portion 32 is substantially channel shape in cross section and has upwardly extending side walls 55, the rear end portions of which curve downwardly and rearwardly as indicated at 56. The forward end portions of the side walls 55 are cut away to provide substantially semi-circular bearing surfaces or seats 57. Inwardly of the seats 57 a pair of spaced apart disks 58 are mounted on the hand grip 32 which have aligned openings 59.

When the two movable members are assembled the lower rounded portions of the ears 45 of the upper member will be received by the seats 57 of the other movable member and the inner faces of the ears 45 will engage the outer faces of the disks 58 to cooperate in guiding the movable members in their relative pivotal movements and prevent relative lateral movement of the two members.

The spring 34 comprises two legs 60 and 61 which are joined by a substantially centrally disposed coil 62. The coil 62 is disposed between the disks 58 and the opening in the coil is in alignment with the openings 46 and 59 of the ears 45 and the disks 58, respectively. The pivot element 33 extends through the aligned openings in the ears 45, the disks 58 and the coil 62 to maintain the movable members in proper pivotal relationship. The pivot element 33 may be in the form of a rivet as is illustrated in Figure 8 of the drawing. The legs 60 and 61 of the spring 34 will engage against the inner faces of the hand grips 31 and 32, respectively, to normally urge the jaws 29 and 30 into clamping position.

A bow pole 63 has one end secured to the bow 11 of the boat by rivets or the like 64. The bow pole extends outwardly beyond the side of the boat 13 and has secured to its outer free end portion one end of a bow line or cotton tag line 65. The opposite end portion of the bow line 65 is threaded through the slots 37 and 49 and is secured to the main portion of the bow line by wire 66 which is wrapped around the bow line 65 and the free end portion thereof as is shown in Figure 6 of the drawing.

In the use of the device the free end portion of the fish line 17 is threaded through the aligned openings 39 and 51 of the jaws 29 and 30 and the hook 27 and sinker 25 are then attached to the line 17. At this time the clamp A and the lines 17 and 65 are substantially in the positions indicated in dotted lines in Figure 1 of the drawings. The winch 15 is then put into operation to feed the line 17 until the desired amount has been payed out. The hand grips 31 and 32 will then be pressed together to permit the line 17 to be moved through the entrance passageways 41 and 53 into the space between the gripping surfaces 36 and 48 of the jaws 29 and 30, respectively.

The pressure will then be released upon the hand grips 31 and 32 and the force of the spring 34 will cause the jaws to approach one another so that the fishing line 17 will be firmly clamped therebetween as is shown in Figure 3 of the drawing. The winch 15 will again be put into operation to pay out the line 17 so that the clamp A and the bow line 65 will now assume the full line position indicated in Figure 1 of the drawing. In this position the bow line 65 will be drawn taut so that the bow line will exert pressure upon the noses 35 and 47 to supplement the action of the spring 34 in maintaining the jaws 29 and 30 in firm clamping engagement with the line 17. This action of the bow line 65 is greatly enhanced by the round portions 38 and 50 of the noses 35 and 47, respectively.

The fisherman will operate the winch 15 to unreel an additional portion of the line 17 to provide a slack portion indicated at 17a in Figure 1 of the drawing. The winch will then be stopped and the brake applied to prevent further unwinding of the line 17. When it is desired to pay out more of the line 17 or to pull the line up, the fisherman will operate the winch 15 to draw the line 17 and the clamp A to the dotted line position illustrated in Figure 1 of the drawings. The fisherman will release the grip of the jaws 29 and 30 on the line 17 by pressing on the hand grips 31 and 32 and will turn the clamp through approximately 90 degrees from the position shown in Figures 1 and 2 of the drawings. The line 17 will then be free to move through the entrance passageways 41 and 53 into the openings 39 and 51 through which it will be free to move in either direction.

The sides of the openings 39 and 51 opposite to the entrance passageways 41 and 53, respectively, are closed so that the line 17 cannot escape from the clamp A.

During the relative movements of the movable members of the clamp, the portions 67 of the inner surface of the upper member will have rocking engagement with the disks 58 to mutually support the movable members and to relieve the pivot element 33 of some of the strain, the opposite ends of the coil 62 of the spring 34 bear against the inner surfaces of the disks 58 so that the spring 34 is held in properly centered position.

The depth of the fishing gear may be determined by the fisherman. By referring to Figure 1 of the drawings which shows the line 17 passing through the clamp, the sinker 25 in the form of a cannon ball on the end of the line and the stops 28 placed stationary on the line will be noted. The clamp as devised permits these stops and the line to go in and out freely when it is so turned by the fishermen without tearing up the equipment and the clamp does not have to be removed from the line. It should be borne in mind that each individual fisherman may want to change the stops on the fishing line to suit his needs, but regardless of where he places them they can run freely at his instance by simply turning the jaws of the clamp open or shut.

It is obvious that various changes and modifications may be made in the details of construction and design of the above specifically described embodiment of this invention without departing from the spirit thereof, such changes and modifications being restricted only by the scope of the following claims.

What I claim is:

1. An improved fishing line clamp for use with a deep sea fishing line mounted on a fishing boat comprising a pair of movable members pivotally connected together and having openings therein through which the fishing line is adapted to pass, said movable members having cooperating fishing line gripping surfaces for clamping the fishing line therebetween when the fishing line has reached the desired depth, spring means for normally urging the gripping surfaces of the movable members into gripping engagement with the fishing line, said movable members having passageways whereby the fishing line can be moved from the openings in the movable members to a position between the gripping surfaces of the movable members, said passageways being disposed on opposite sides of said movable members and opening therethrough and communicating with said openings, the opposite sides of the openings being closed to prevent escape of the fishing line.

2. An improved fishing line clamp for use with a deep sea fishing line mounted on a fishing boat, comprising a pair of movable members pivotally connected together and having openings therein through which the fishing line is adapted to pass, said movable members having cooperating fishing line gripping surfaces for clamping the fishing line therebetween when the fishing line has reached the desired depth, and spring means for normally urging the gripping surfaces of the movable members into gripping engagement with the fishing line, said openings being in axial registry with one another and having their axes substantially at right angles to the gripping surfaces of the movable members, said movable members having passageways communicating at all times with said openings and through which the fishing line can be moved from the gripping surfaces to said openings and from said openings to said gripping surfaces.

3. An improved fishing line clamp for use with a deep sea fishing line mounted on a fishing boat comprising a pair of movable members pivotally connected together and having openings therein for permitting the fishing line to pass therethrough, said movable members comprising a pair of jaws having cooperating gripping surfaces for clamping the fishing line therebetween when the fishing line has reached the desired depth, spring means for normally urging the gripping surfaces of the jaws into gripping engagement with the fishing line, said movable members having aligned slots in the free end portions of the jaws, a tag line having its rear end portion threaded through the slots in said jaws and having its rear end portion secured to the main portion of said tag line to provide a loop having opposed side portions, and means attached to the forward end portion of the tag line for holding the tag line and clamp remote from the boat and for drawing the tag line taut when the fishing line has reached the desired depth to cause the opposed side portions of the loop to exert a closing pressure upon the jaws, whereby the closing action of the spring means is supplemented.

JAMES W. RILEY.

REFERENCES CITED

The following references are of record in the file of this patent:

UNITED STATES PATENTS

| Number | Name | Date |
|---|---|---|
| 2,170,594 | Nicholson | Aug. 22, 1939 |
| 2,209,697 | Kislingbury | July 30, 1940 |
| 2,514,698 | Herrero | July 11, 1950 |